No. 725,993. PATENTED APR. 21, 1903.
E. C. SACHSE.
MANUFACTURE OF FIRE KINDLERS.
APPLICATION FILED JUNE 3, 1902.
NO MODEL.
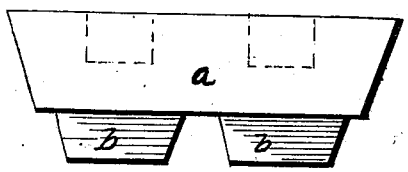
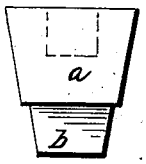
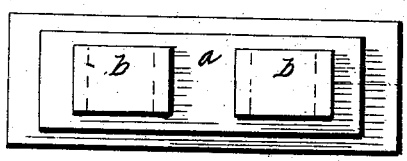
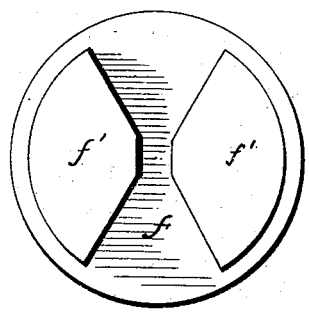
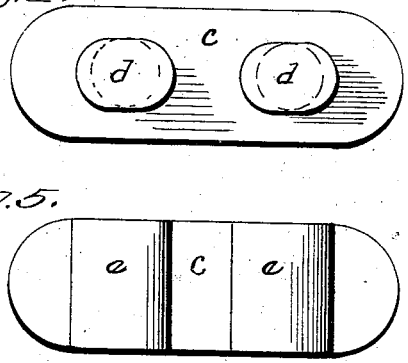
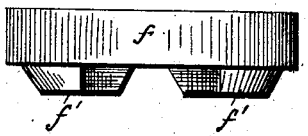
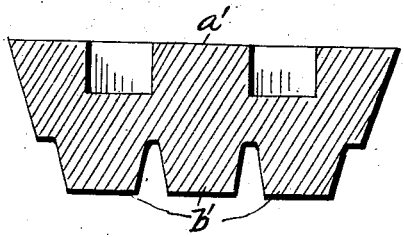
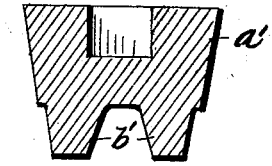
WITNESSES:
Rudolf Hopff.
R. A. Brswell.
INVENTOR
Ernest C. Sachse.
THE NORRIS PETERS CO., PHOTO-LITHO., WASHINGTON, D. C.

United States Patent Office.

ERNEST C. SACHSE, OF ST. LOUIS, MISSOURI.

MANUFACTURE OF FIRE-KINDLERS.

SPECIFICATION forming part of Letters Patent No. 725,993, dated April 21, 1903.

Application filed June 3, 1902. Serial No. 110,031. (No specimens.)

*To all whom it may concern:*

Be it known that I, ERNEST C. SACHSE, a citizen of the United States, residing at St. Louis, in the State of Missouri, have invented certain new and useful Improvements in the Manufacture of Fire-Kindlers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in the process of manufacture, and in fire-kindlers, and in describing the invention in detail reference will be had to the accompanying drawings, forming a part of this specification, and wherein like letters of reference will be employed for designating like parts throughout the several views, in which—

Figure 1 is a side elevation of one form of a cake or block of improved fire-kindler as manufactured by my improved process. Fig. 2 is an underneath plan view of the same. Fig. 3 is an end view thereof. Fig. 4 is an underneath plan view of a modified form of cake or block of the kindler. Fig. 5 is a modification showing another form of block or cake. Fig. 6 is a horizontal sectional view of another modification. Figs. 7 and 8 are respective underneath and side elevations of another modification, and Fig. 9 is a cross-sectional view of the form shown in Fig. 6.

In carrying out my process I employ in connection therewith a mold of approved form, a preferable form of which has been made the subject of a separate application for Letters Patent. I employ a mold having a series of compartments in which the composition entering into the kindler is placed after being treated in a specific manner, as will be described, whereby the material is formed into cakes or blocks that are allowed to harden after solidifying in the mold and are then treated in a specific manner with a composition to be later described.

The kindler produced by my new process consists of a composition or mixture of stable-manure, dried hops, cut hay, wood-chips, shavings, and the like. Suitable quantities of each of these materials are used, and the mixture is placed in a kettle of suitable size, then subjected to heat, and thoroughly mixed. A prepared solution is then mixed with the previously-described mixture, this solution preferably consisting of rosin, oil, and tar in suitable proportions, or, if desired, the rosin alone may be used and the other two ingredients omitted, though I prefer to use the mixture as stated. This mixture as now produced is further subjected to heat for a considerable length of time and is then taken out of the kettle and placed in a mold, preferably provided with a number of compartments, as aforestated. When the mixture as removed from the kettle is placed in the mold, it is subjected to enormous pressure in order to solidify the mixture in the different compartments of the mold. After being subjected to pressure and solidified within the mold the cakes or blocks into which the mixture has been formed are removed from the mold and are dipped in another prepared solution of rosin, oil, and tar. The kindler even after being subjected to the pressure is sufficiently porous to absorb the solution, and after the absorption the kindler is ready for use.

I have heretofore stated specific materials and ingredients which form a very desirable product; but I do not limit myself to the materials or ingredients stated, as in the manufacture I have used the refuse of hops from breweries, stable-manure, horse-bedding, wood-chips, shavings, cut hay, straw, corn-cobs, and like materials. Suitable proportions of each are used and, as stated, are placed in a kettle and subjected to heat and thoroughly heated while being thoroughly mixed during the heating process, and during the heating process the mixture or solution of rosin, oil, and tar, and in addition, if desired, pitch, may be added.

The mold which I employ and which has been made the subject for a separate application for Letters Patent is so constructed that when the mixture is subjected to the pressure a portion of the mixture is forced down into depressions in the mold, so as to form feet or projections on each cake or block of the kindler, these feet or projections serving to support the body of the cake or kindler above the grate on which it rests, so that the fire may have free access in under and around the same.

In the accompanying drawings I have shown various forms of cakes or blocks of the kindler, in Fig. 1 $a$ representing the body of a substantially oblong cake or block having feet $b$, different views of this same cake being shown in Figs. 2 and 3. In Fig. 4 the body $c$ is substantially rectangular with rounded ends and substantially oval-shaped feet $d$, and in Fig. 5 the body $c$ is of the same form as shown in Fig. 4, while the feet $e$ are shown as extending the width of the cake. Figs. 7 and 8 show the body $f$ of a circular form and the feet $f'$ of a segment shape, while in Figs. 6 and 9 the body $a'$ has a plurality of feet or supporting projections $b'$.

It will be evident that the article may be manufactured in any desired shapes.

Suitable proportions of the ingredients or substances are employed in the mixture and also suitable proportions of the ingredients in the solutions.

Having fully described my invention, what I claim as new, and desire to secure by Letters Patent, is—

1. The herein-described process for producing fire-kindler, consisting of heating a mixture of inflammable material, thoroughly mixing the same during the heating thereof, adding a solution of inflammable ingredients to the heating mixture, then removing the mixture and subjecting the same to pressure to solidify the same, and finally treating the solidified mixture to a solution of inflammable ingredients, substantially as described.

2. The herein-described process for producing fire-kindler consisting of heating a mixture of inflammable materials, adding a solution of inflammable ingredients to the mixture during the heating, subjecting the mixture to pressure after it is thoroughly heated and mixed to solidify the same, and finally dipping the solidified mixture in a composition of inflammable ingredients, substantially as described.

In testimony whereof I affix my signature in presence of two witnesses.

ERNEST C. SACHSE.

Witnesses:
RUDOLF HOPFF,
WM. C. BOLM.